United States Patent [19]

Tollefson

[11] Patent Number: 4,993,661
[45] Date of Patent: Feb. 19, 1991

[54] TAPE CASSETTE WITH TAPE LEADER DETECTION IMPROVEMENTS

[75] Inventor: Dale T. Tollefson, Woodbury, Minn.

[73] Assignee: Minnesota Mining and Manufacturing Company, St. Paul, Minn.

[21] Appl. No.: 351,412

[22] Filed: May 12, 1989

[51] Int. Cl.$^5$ .............................................. G11B 23/06
[52] U.S. Cl. .................. 242/188; 242/186; 242/199; 360/74.6; 360/132
[58] Field of Search .................. 242/197–200, 242/186, 188; 360/74.6, 132; 235/473; 250/227.11, 227.28

[56] References Cited

U.S. PATENT DOCUMENTS

| | | |
|---|---|---|
| 3,288,385 | 11/1966 | Markakis et al. |
| 4,032,987 | 6/1977 | Singer et al. |
| 4,072,995 | 2/1978 | Sato |
| 4,091,426 | 5/1978 | Umeda |
| 4,173,319 | 11/1979 | Umeda |
| 4,343,024 | 8/1982 | Kawai |
| 4,363,059 | 12/1982 | Matsuzawa et al. |
| 4,452,408 | 6/1984 | Sasaki |
| 4,484,248 | 11/1984 | Ogiro et al. |
| 4,530,475 | 7/1985 | Buerkle et al. |
| 4,602,303 | 7/1986 | Pertzsch et al. ............ 360/74.6 |
| 4,740,851 | 4/1988 | Jones et al. |

FOREIGN PATENT DOCUMENTS

| | | |
|---|---|---|
| 3408694A1 | 9/1985 | Fed. Rep. of Germany . |
| 55-70947 | 5/1980 | Japan . |
| 60-63754 | 4/1985 | Japan . |
| 61-192095 | 8/1986 | Japan . |
| 63-249991 | 10/1988 | Japan . |
| 2119751A | 4/1985 | United Kingdom . |

Primary Examiner—Stuart S. Levy
Assistant Examiner—Steven M. duBois
Attorney, Agent, or Firm—Kinney & Lange

[57] ABSTRACT

An optical tape leader detection system includes a light source and a light detector. In a video cassette using opaque magnetic tape, the tape follows a defined tape path and has a transparent leader at each end thereof, with the free ends of the leader being mounted to first and second tape winding hubs. A light transmissive cassette cover supports the first and second hubs, and a source receiving aperture in the cassette cover is adapted to receive the light source. A window is provided in the cassette cover, allowing light emitted from the light source and passing through the transparent leader portion to reach the light detector along a defined light path. One or more light pipes are mounted in the cassette cover and aligned to define portions of that light path, thereby controlling the source and amount of light with respect to the light detector.

32 Claims, 3 Drawing Sheets

TAPE CASSETTE WITH TAPE LEADER DETECTION IMPROVEMENTS

BACKGROUND OF THE INVENTION

1. Field of the Invention

The present invention relates to tape cassettes. More particularly, the present invention relates to an apparatus for use in a tape cassette cover which allows the cassette cover to be formed of a light reflective material.

2. Description of the Prior Art

Cassette tapes which are typically used with video cassette recorders have two tape reels which are mounted on hubs. A magnetic, opaque tape is coupled to the tape reels and is transferred from one reel to the other when the hubs turn during operation of the video cassette recorder.

Opposite ends of the tape usually include transparent tape leaders or trailers (hereinafter leader portions). The leader portions are used in combination with a tape end detector in the cassette recorder to accomplish detection of the end of the tape.

Typically, the tape end detector in the recorder includes a light source and two light detectors or photocells. When the tape cassette is inserted into the video cassette recorder, the light source enters the tape cassette through an aperture in the tape cassette cover which is positioned between the two tape reels. Also, the tape cassette cover has two windows located on opposite sides of the cover which are aligned with the photocells in the cassette recorder when the tape cassette is inserted into the recorder.

As the tape is wound from one tape reel to the other (for example, when the tape is being played or rewound) the tape follows a path which runs between the light source and the photocells. Since the tape is opaque (other than the transparent leader portions), the tape blocks light emitted from the light source, thereby keeping it from impinging on the photocells. However, when the tape is substantially unwound from one reel, one of the transparent leader portions of the tape is positioned in the tape path between the light source and a photocell. Therefore, when the tape is unwound, light from the light source passes through the transparent leader portion of the tape and impinges on the photocell. The photocell, in turn, emits an electrical signal which indicates that the tape is at its end and the recorder stops the hubs from turning.

Since the electrical signal which signifies that the tape is at an end is light activated, it is important to minimize any extraneous light in the cassette which could pass around the opaque tape and trigger the photocell at the wrong time. Basically, there are two sources of such extraneous light. The first is unwanted reflection from the light source itself and the second is extraneous light being transmitted through the base and cover from an external source of light. In the past, these extraneous light sources were minimized by packaging the tape in a light absorbent, black cassette cover.

Recently, many movies, sound recordings, educational programs and other programs have been prerecorded on cassettes which use tape end detectors of the type described above. These cassettes are commercially available to be purchased or rented at retail level outlets. Hence, retail marketing and advertising has become very important to companies who sell and rent the tapes.

Also, generally, in retail establishments which sell or rent the cassette tapes, the cassette tapes are openly displayed so that potential customers may review them. For this reason, it is desirable for the tape covers to be manufactured in various colors and styles which are aesthetically pleasing. However, until now, tape covers which were manufactured in light transmissive colors (i.e., colors besides black) would cause the cassette recorder to malfunction due to extraneous light being transmitted by reflection or by external sources in the cassette cover. This extraneous light would prematurely activate the photocells, thereby prematurely stopping the hubs from turning and the tape from being played, rewound, etc.

One attempt to address this problem is disclosed in a United Kingdom patent publication, in GB No. 2119751A. In the tape cassette shown in this reference, a tape cassette was made of a color other than black, but certain portions of the cassette were formed of black material or were coated black. However, this required the cassette to be specially painted or to be formed using a dual molding process.

SUMMARY OF THE INVENTION

The present invention is responsive to the need for standard tape cassettes which have covers that are manufactured in light transmissive colors and which are used with a tape leader detector that includes a light source and a light detector. The tape cassette of the present invention includes a first hub, a second hub and a tape, having a transparent leader portion, which is coupled to the first and second hubs. The tape moves along a tape path when travelling between the first and second hubs. A light transmissive cassette cover supports the first and second hubs and has a source receiving aperture for receiving the light source. The cassette cover also has a window. A light path is provided between the source receiving aperture and the window and intersects the tape path. The light path allows light emitted from the light source and passing through the leader portion to reach the light detector. A light pipe is coupled to the cassette cover adjacent the light receiving aperture and aligned to define a portion of the light path.

In one preferred embodiment, the light pipe is black and has a square cross-section. The light pipe is press fit within preexisting notches in the cassette cover so the light pipe can be used without altering the cassette cover.

In a second embodiment, the light pipe is integrally formed with shaft inserts. The shaft inserts are press fit within the source receiving aperture of the cassette cover to cover a seam in the source receiving aperture, and thus prevent unwanted light leaks from erroneously activating the light detector.

DETAILED DESCRIPTION OF THE PREFERRED EMBODIMENTS

Figure 1:
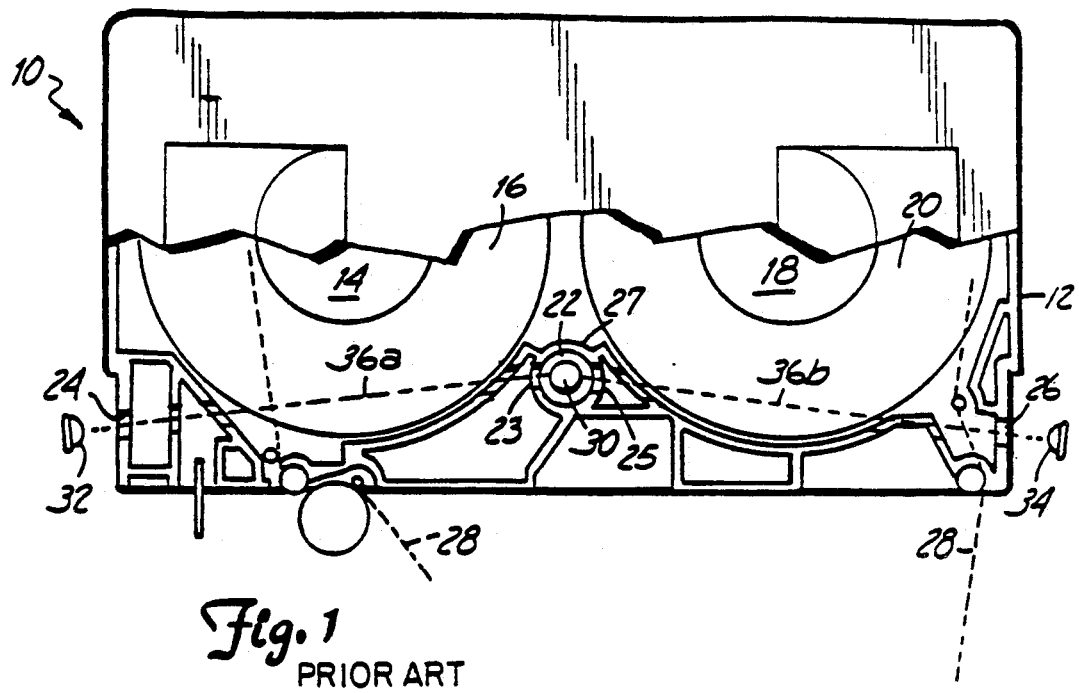
FIG. 1 is a top sectional and schematic representation of a simplified prior art tape cassette.

FIG. 1 shows a simplified prior art tape cassette 10. The tape cassette 10 includes a tape cassette cover 12, a first hub 14 and a first tape reel 16 as well as a second hub 18 and a second tape reel 20. The cassette cover 12 has a source receiving aperture 22 as well as first and second windows 24 and 26 and a tubular source shaft 27. An opaque tape 28 (preferably magnetic) is wound on the tape reels 16 and 20 and is connected to the hubs 14 and 18 by transparent leader portions integrally coupled to opposite ends of the tape 28.

For operation, the tape cassette 10 is inserted in a cassette recorder, such as a video cassette recorder (not shown). As the tape cassette 10 is positioned in the video cassette recorder, a light source 30 enters through the source receiving aperture 22 into the tubular source shaft 27. Also, the first and second windows 24 and 26 are substantially aligned with a pair of light detectors in the video cassette recorder such as photocells 32 and 34. A pair of notches 23 and 25 are provided in the tubular shaft 27. Therefore, two light paths 36a and 36b are formed. Light emitted by the light source 30 travels along the light paths 36a and 36b, through the notches 23 and 25 and through the windows 24 and 26, to impinge on the photocells 32 and 34. The light source 30 is typically a 900 nanometer infrared emitting diode light source.

As the hubs 14 and 18 are turned during operation (for example, to rewind or play the tape 28), the tape 28 follows a tape path, while travelling between the hubs 14 and 18, which intersects both light paths 36a and 36b. Hence, during operation, the opaque tape 28 blocks light travelling along the light paths 36a and 36b thereby keeping it from impinging on the photocells 32 and 34.

However, when the opaque tape 28 is substantially unrolled from either tape reel 16 or 20, one of the transparent leader portions which connects the opaque tape 28 to the hubs 14 and 18 crosses either the light path 36a or 36b, respectively. Once the transparent leader portion of the tape 28 crosses the light path 36a or 36b, light which is emitted from the source 30, and which is travelling along the light path, travels through the transparent leader portion and is allowed to impinge on the corresponding photocell 32 or 34.

When an adequate amount of light is impinged on either photocell 32 or 34, the photocell is activated and emits an electrical signal indicating that the tape 28 has reached its end. Based on that electrical signal, known components in the video cassette recorder (not shown) control winding mechanisms in the recorder appropriately.

Since there are transparent leader portions at both ends of the tape 28, photocells 32 and 34 indicate that the tape 28 is at its end when either reel 16 is empty or when reel 20 is empty. Therefore, the winding mechanism in the cassette recorder can be stopped when the tape 28 has been completely played or completely rewound.

As discussed, the photocells 32 and 34 are light activated. Therefore, the light exposure to the photocells must be carefully monitored and controlled. It is desirable to eliminate all extraneous light which could cause the photocells 32 and 34 to falsely indicate an end of tape condition. For this reason, the tape cassette cover 12 of the prior art tape cassette 10 is manufactured of a light absorbent, black material. This substantially reduces any external light from entering the cassette cover 12 and also substantially reduces any extraneous reflection or transmittance of light from the light source 30 within the cassette cover 12.

Figure 2:
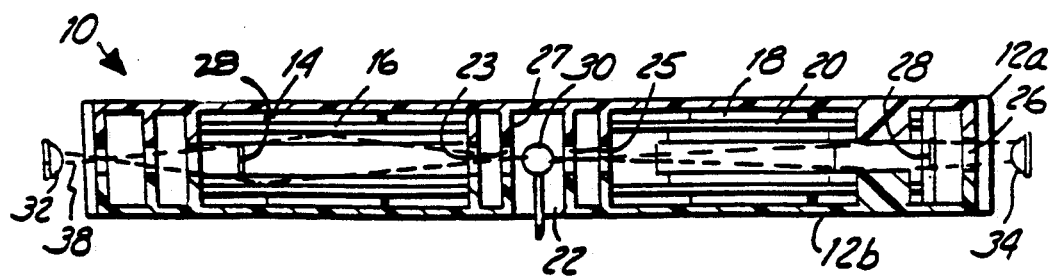
FIG. 2 is a side sectional and schematic representation of a portion of the prior art tape cassette shown in FIG. 1.

FIG. 2 shows a side sectional view of the simplified prior art tape cassette 10. The parts shown in FIG. 2 are substantially identical to those shown in FIG. 1 and are correspondingly numbered. FIG. 2 also shows a light path 38 which represents light emitted by the source 30 and reflected from the cassette cover 12. This reflection would result if the cassette cover 12 were made of a reflective material. FIG. 2 shows that the light which is reflected along the light path 38 travels around the opaque tape 28, through the window 24 and impinges on the photocell 32. If enough light is reflected around the tape 28, the photocell 32 is activated. This results in a premature indication from the photocell 32 that the tape 28 is at its end. It is because of this reflected light and the likelihood of the reflected light generating a premature end of tape signal that the cassette covers 12, until now, have been made of opaque black material or any other color having the equivalent light interrupting effect.

Figure 3:
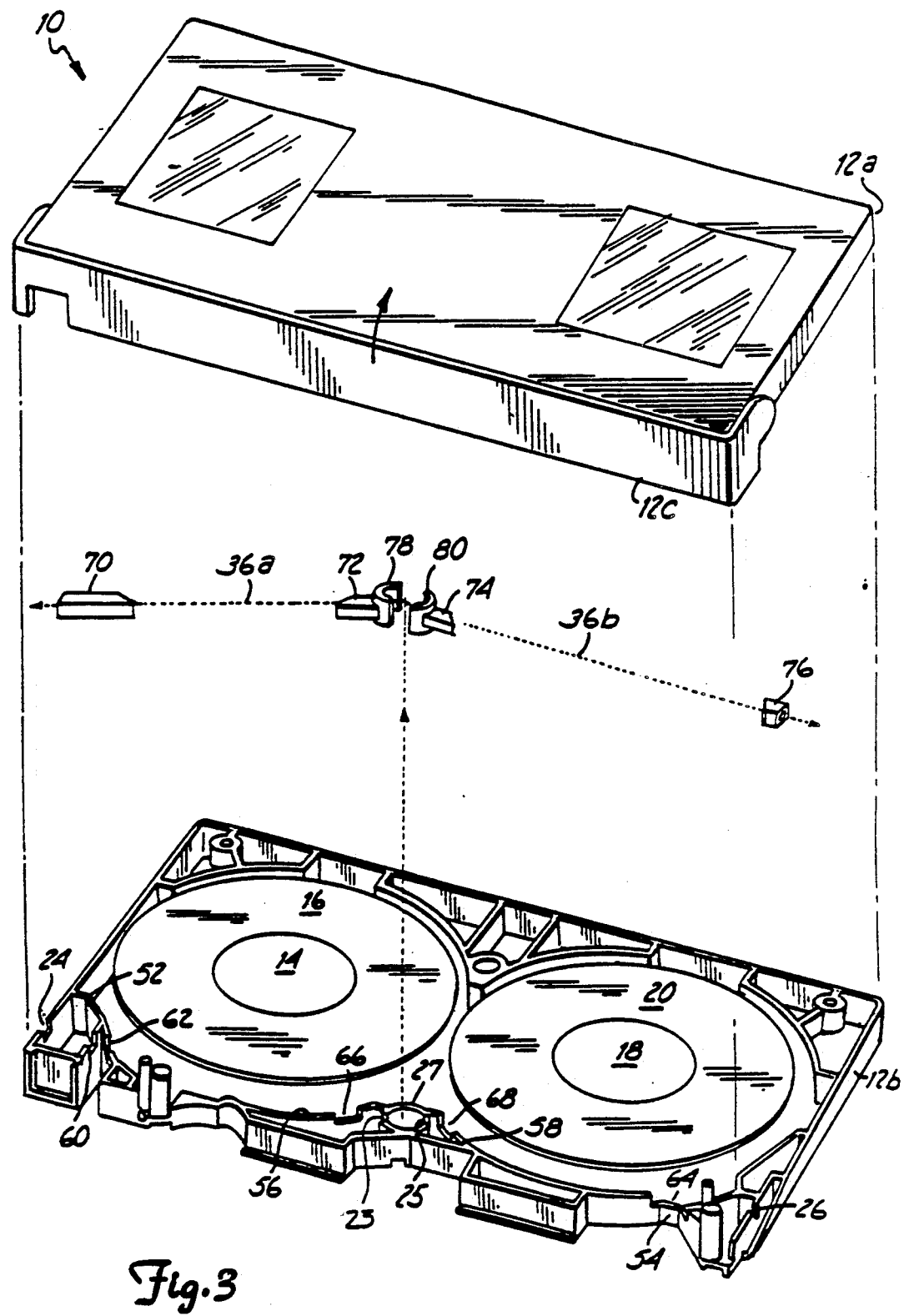
FIG. 3 is an exploded perspective view of the tape cassette of FIG. 1 implementing the present invention.

FIG. 3 is a more detailed, exploded view of the tape cassette 10 (a standard VHS video cassette) utilizing one embodiment of the present invention. The tape cassette 10 includes top cassette cover 12a, bottom cassette cover 12b and pivotal end cover 12c. Also, the tape cassette 10 shown in FIG. 3 includes many of the same elements as that shown in FIGS. 1 and 2 and those elements are correspondingly numbered.

Also shown in FIG. 3 are two side ribs 52 and 54 and two center ribs 56 and 58 all of which are integrally formed with bottom cassette cover 12b. The side rib 52 is provided with a pair of notches 60 and 62 and the side rib 54 is provided with a notch 64. The center rib 56 is provided with a notch 66 and the center rib 58 is provided with a notch 68. These ribs and notches define the light paths 36a and 36b. The light path 36a is defined as a line from a window 24 through the notches 60 and 62 in the side rib 52, through the notch 66 in the center rib 56, through the notch 23 in the tubular shaft 27 to the light source 30. Similarly, the light path 36b is defined as a line from the window 26, through the notch 64 in the side rib 54, through the notch 68 in the center rib 58 and through the notch 25 in the tubular shaft 27 to the light source 30.

In order to eliminate the extraneous light reflection discussed above, a set of light pipes 70, 72, 74 and 76 is used and is shown in FIGS. 3-6. In a preferred embodiment, light pipes 72 and 74 are integrally formed with shaft inserts 78 and 80, respectively. The advantages of the shaft inserts 78 and 80 will be discussed shortly. The light pipe 72 and the shaft insert 78 are press fit within the tubular shaft 27 and the notches 23 and 66. The light pipe 74 and the shaft insert 80 are press fit within the tubular shaft 27 and the notches 25 and 68. The light pipe 70 is press fit into the window 24 and the notches 60 and 62. Similarly, the light pipe 76 is press fit into the window 26.

In this embodiment, the light pipes 70, 72, 74 and 76 are black (or have blackened walls) and have a square external lateral cross-section with an axial bore (or hole) through which light passes. The light pipes are formed using injection molding, thermal molding or other plastic formation methods. (It should be noted that the light pipes are to be non-light transmissive. For example, they can be coated with a black coating, formed of black material or formed of any color material as long as the bore is black.) When assembled with respect to the cover 12 as seen in FIG. 3, the axial bore through the light pipe 70 is aligned with the axial bore through the light pipe 72 along the light path 36a. Similarly, when assembled as seen in FIG. 3, the axial bore through the light pipe 74 is aligned with the axial bore through the light pipe 76 along the light path 36b. Therefore, the light paths 36a and 36b are uninterrupted by the light pipes 70, 72, 74, 76 and the shaft inserts 78 and 80. Rather, the light pipes and inserts define and surround portions of the light paths.

The light pipes 70, 72, 74 and 76 restrict the amount of light transmitted from within the cassette cover 12 to the photocells 32 and 34 and also control the direction of the transmitted light. This reduces the amount of extraneous reflected or transmitted light from external illumination sources and from the source 30 itself (i.e., the light reflected along the light path 38 in FIG. 2) which reaches photocells 32 and 34. Because of the resulting reduction in reflected and transmitted light, the likelihood of extraneous light being reflected or transmitted around the tape 28 and prematurely activating either of the photocells 32 or 34 is substantially eliminated.

Figure 4:
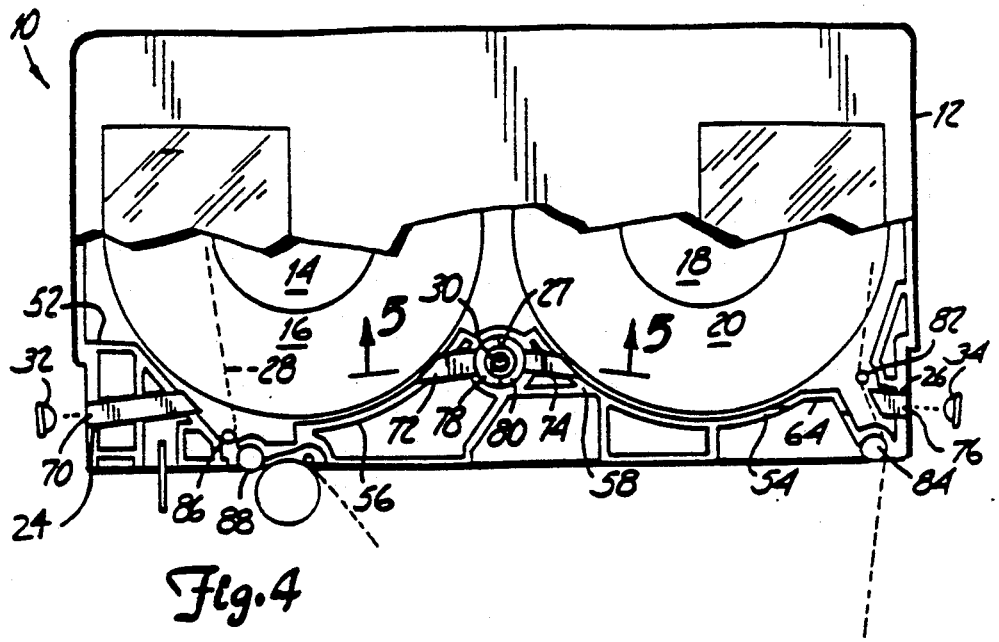
FIG. 4 is a top view of a tape cassette implementing the present invention, with a portion of the cover broken away.

The light pipes 70 and 76 are of different lengths due to the difference in the way that the tape 28 is removed from and rolled onto hubs 14 and 18 during reading and recording in a video cassette recorder. As seen in FIG. 4, the tape 28 is guided to and from hub 18 via pin 82 and sleeve 84. This takes the tape along a path which is angled outwardly from light source 30 near light pipe 76. However, the tape 28 is rolled onto and off of hub 14 in a different manner. The tape path adjacent the hub 14 is defined in part by a roller 86 and a sleeve 88, as seen in FIG. 4. The path that the tape 28 follows to and from the hub 14 spaces the tape 28 further from the window 24 than the tape path to and from the hub 18 is spaced from the window 26. Therefore, light pipe 70 is longer than light pipe 76, thereby further reducing the likelihood that any extraneous reflected or transmitted light will falsely activate the photocell 32. Essentially, the light pipes cover nearly all portions of the light path which are not directly intersected by the tape 28.

Another problem which contributes to the premature activation of the photocells 32 and 34 is light leaks which occur in the tubular shaft 27. Cassette cover 12 is formed of primarily two sections 12a and 12b which are fit together during assembly and which form a central seam 13 (see FIG. 5). The seam 13 runs radially through the center of tubular shaft 27. At times, due to imperfect manufacturing or assembly, the sections 12a and 12b do not tightly fit with one another and gaps are formed in the tubular shaft 27 along the seam 13. Therefore, light can leak from the source 30 through the gaps in the tubular shaft 27. In a black cassette, such light leaks are of little concern because the light will not be readily reflected or transmitted. In a cassette which is not black or which is formed of a light reflective or light transmissive material, however, such light leaks can impair the end-of-tape detection system.

Figure 5:
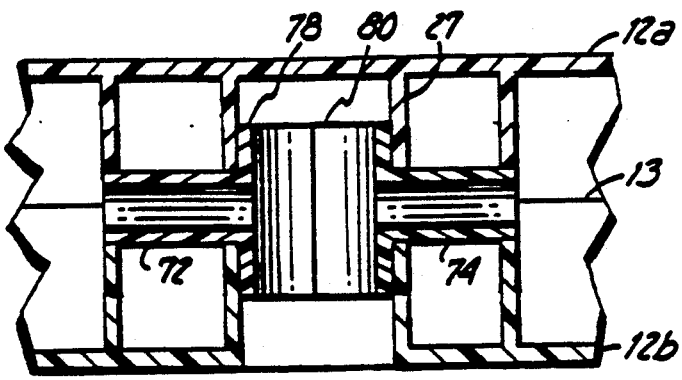
FIG. 5 is an enlarged side sectional view of the light source mask of the present invention, as taken along line 5—5 in FIG. 4.
Figure 6:
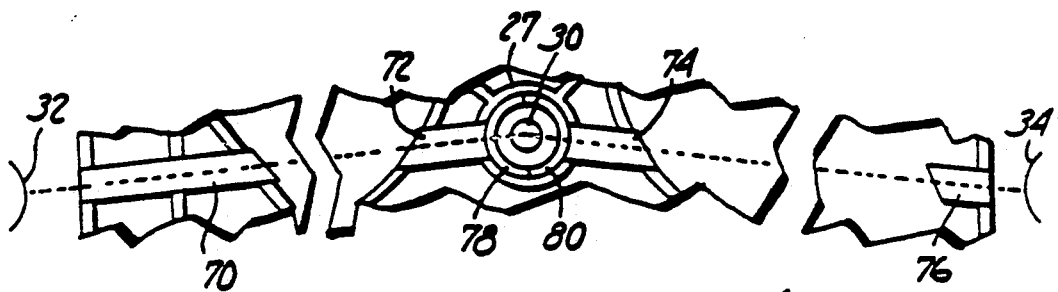
FIG. 6 is an enlarged detailed fragmentary sectional view of the light path in the tape cassette of FIG. 4.

To remedy this problem, a source mask is provided which comprises the integrally formed light pipe 72 and half-cylinder shaft insert 78, as well as the integrally formed light pipe 74 and half-cylinder shaft insert 80. FIG. 5 is an enlarged cross-sectional view of the source mask of the present invention taken along lines 5—5 in FIG. 4. In the embodiment shown in FIGS. 3-6, the source mask is a two piece injection molded plastic component. (Like the light pipes, the source mask can also be formed using other plastic formation methods.) With this arrangement, the seam 13 in the tubular shaft 27 is substantially covered by the shaft inserts 78 and 80. Hence, any light leaks resulting from improper abutment or assembly of the cover sections 12a and 12b are substantially masked over.

In this embodiment, the light pipes and the source mask are manufactured to fit in the pre-existing notches 23, 25, 60, 62, 64, 66 and 68 as well as the pre-existing windows 24 and 26. Therefore, a standard tape cassette cover need not be altered to accommodate the light pipes and source mask of the present invention. Also, the integral piece comprising light pipe 72 and shaft insert 78 is identical to the integral piece comprising light pipe 74 and shaft insert 80 (for insertion, one piece is merely rotated 180 degrees relative to the other and over the tubular shaft 27 to be inserted in the tubular shaft 27 to mate with the other piece).

The light pipes 70, 72, 74 and 76 of the present invention have been tested for efficiency. An illustration of the effectiveness of the light pipes of the present invention is outlined below.

A preferred specification for the maximum allowable light transmittance in a video cassette is 0.2%. In cassettes with blue covers and without the light pipes of the present invention, light transmittance readings were measured at 0.23% to 0.18%. In other words, the transmittance in a blue cassette cover without the light pipes of the present invention was over the allowable maximum.

By inserting only the light pipes (70 and 76) adjacent the windows, provided with 0.125 inch diameter holes, the light transmittance in the blue cassette was cut to a level between 0.10% and 0.12%, and the holes allowed enough light to pass through to properly activate the photocells.

In an alternative embodiment, the holes in the light pipes 70 and 76 are threaded with a 6-32 thread, resulting in an effective opening of about 0.100 inch diameter. In this embodiment, with a blue cassette, the light transmittance decreased to between 0.08% and 0.10%. The coarse thread on the inner walls of the light pipe hole dampened the transmitted and reflected light while allowing the direct light from light source 30 to pass through the hole. As a result, this threaded opening allows enough light through to properly activate the photocells. Therefore, the present invention can be implemented, at least in a blue cassette, by using only the light pipes (70 and 76) adjacent the window.

Although the light transmittance readings dropped to an acceptable level when only light pipes adjacent the windows were used, cassettes may be used in environments which require the light pipes (72 and 74) and inserts (78 and 80) adjacent the light source as well. For example, if the cassette cover 12 were a color lighter than blue (i.e., yellow or white), excess transmittance caused by the brighter color cassette cover may require that light pipes 72 and 74 be used.

In a blue cassette using all four light pipes, 70, 72, 74, and 76, with 0.130 inch diameter holes, the light transmittance readings were 0.06% —enough transmitted light to properly activate photocells 32 and 34.

The light pipes 70, 72, 74 and 76 and the source mask of the present invention are inexpensive to manufacture and fit within existing notches in standard tape cassettes. Therefore, implementation of the present invention in standard tape cassettes is quite inexpensive.

Additionally, the light pipes 70, 72, 74 and 76 and the source mask of the present invention allow the use of light transmissive materials (i.e., materials with colors other than black) in the manufacture of tape cassette covers 12. Therefore, the tape cassette covers 12 can be made more aesthetically pleasing.

Although the present invention has been described with reference to preferred embodiments, workers skilled in the art will recognize that changes may be made in form and detail without departing from the spirit and scope of the invention.

What is claimed is:

1. A tape cassette for use with a tape leader detector which includes a light source and at least one light detector, comprising:
    a first hub;
    a second hub;
    a tape, connected to the first and second hubs, which has at least one transparent leader portion and travels along a tape path when moving between the first and second hubs;
    a light transmissive cassette cover supporting the first and second hubs;
    a source receiving aperture in the cassette cover for receiving the light source;
    a window in the cassette cover;
    a light path between the source receiving aperture and the window, the light path intersecting the tape path, for allowing light emitted from the light source and passing through the leader portion of the tape to reach the light detector; and
    light pipes coupled to the cassette cover, with at least one light pipe adjacent the source receiving aperture and at least one other light pipe adjacent the window, and with each light pipe having an interior channel therethrough which is aligned to define a portion of the light path.

2. The tape cassette of claim 1 wherein the light pipes further comprise:
    molded plastic pipes having a pipe channel diameter small enough to reduce unwanted reflected and transmitted light in the cassette cover and large enough to allow sufficient light to pass from the light source to the light detector for adequate detection.

3. The tape cassette of claim 2 wherein the pipe channel diameter is approximately 0.130 inches.

4. The tape cassette of claim 1 wherein the cassette cover has preexisting notches and wherein the light pipes are press fit into the preexisting notches in the cassette cover.

5. The tape cassette of claim 1 wherein the light pipes have an external cross-section that mates with the cassette cover.

6. The tape cassette of claim 1 wherein the source receiving aperture is a tubular shaft extending into the cassette cover which has a light emitting aperture therethrough which in part defines the light path, and wherein that light pipe which is adjacent the source receiving aperture, is mounted so that its interior channel is aligned with the light emitting aperture.

7. The tape cassette of claim 6 and further comprising:
    light source mask means, mounted adjacent the tubular shaft, for masking the light source to reduce light leaks.

8. The tape cassette of claim 7 wherein the light source mask means further comprises:
    an insert disposed about a portion of the source receiving aperture within the tubular shaft.

9. The tape cassette of claim 8 wherein the tubular shaft has a shaft seam and wherein the insert is aligned to cover the shaft seam.

10. The tape cassette of claim 8 wherein the insert is formed integrally with the light pipe mounted adjacent the light emitting aperture.

11. The tape cassette of claim 10 wherein the insert and the integrally formed light pipe further comprise:
    a molded plastic insert assembly.

12. The tape cassette of claim 1 wherein the tape leader detector includes a first light detector and a second light detector, the cassette cover has a first window and a second window on opposite ends of the cassette cover, and the light receiving aperture has a first light emitting aperture and a second light emitting aperture, and further comprising:
    a first light pipe coupled to the cassette cover adjacent the first window;
    a second light pipe coupled to the cassette cover adjacent the second window;
    a third light pipe coupled to the cassette cover adjacent the first light emitting aperture of the source receiving aperture and aligned with the first light pipe to define a portion of the light path between the light source and the first light detector; and
    a fourth light pipe coupled to the cassette cover adjacent the second light emitting aperture of the source receiving aperture and aligned with the second light pipe to define a portion of the light path between the light source and the second light detector.

13. The tape cassette of claim 1 wherein the light pipes are black.

14. The tape cassette of claim 1 wherein at least one of the light pipes has a threaded axial bore.

15. A tape cassette for use with a tape leader detector which includes a light source and at least one light detector, comprising:
    a first hub;
    a second hub;
    a tape, coupled to the first and second hubs, which has at least one transparent leader portion and travels along a tape path when moving between the first and second hubs;
    a light transmissive cassette cover supporting the first and second hubs;
    a tubular shaft having a shaft seam and extending into the cassette cover for receiving the light source;
    a light emitting aperture in the tubular shaft;
    a window in the cassette cover;
    a light path between the light emitting aperture and the window, the light path intersecting the tape path, for allowing light emitted from the light source and passing through the leader portion of the tape to reach the light detector; and light source mask means, mounted adjacent a portion of the shaft seam without intersecting the light path, for masking the light source to reduce light leaks from the shaft seam to the window so the light detector is not erroneously activated.

16. The tape cassette of claim 15 and further comprising:
a window light pipe coupled to the cassette cover adjacent the window and aligned to define a first portion of the light path.

17. The tape cassette of claim 15 wherein the light source mask means further comprises:
an insert disposed within a portion of the tubular shaft adjacent the shaft seam.

18. The tape cassette of claim 16 and further comprising:
a shaft light pipe coupled to the cassette cover adjacent the light emitting aperture in the tubular shaft and aligned to define a second portion of the light path.

19. The tape cassette of claim 18 wherein the light source mask means includes an insert disposed within a portion of the tubular shaft adjacent the shaft seam, with the insert being formed integrally with the shaft light pipe.

20. The tape cassette of claim 19 wherein the insert and the integrally formed shaft light pipe further comprise:
a molded plastic insert assembly.

21. In a tape cassette including a first hub, a second hub, a tape connected to the first and second hubs, a transparent leader portion on the tape, a tape path along which the tape moves when travelling between the first and second hubs, a cassette cover supporting the first and second hubs, a source receiving aperture in the cassette cover for receiving an external light source, a window in the cassette cover, and a light path between the source receiving aperture and the window which intersects the tape path and which allows light emitted from the light source and passing through the transparent leader portion to reach an external light detector, an improvement comprising:
a first light pipe coupled to the cassette cover adjacent the window, with first light pipe having an interior channel therethrough which is aligned to define a first portion of the light path.

22. The tape cassette of claim 21 and further comprising:
a second light pipe coupled to the cassette cover adjacent the light receiving aperture, with second light pipe having an interior channel therethrough which is aligned with the first light pipe to define a second portion of the light path.

23. The tape cassette of claim 22 wherein the first and second light pipes further comprise:
molded plastic pipes having a pipe channel diameter small enough to reduce unwanted reflected and transmitted light in the cassette cover and large enough to allow sufficient light to pass from the light source to the light detector for adequate detection.

24. The tape cassette of claim 23 wherein the pipe channel diameter is approximately 0.130 inches.

25. The tape cassette of claim 22 wherein the cassette cover has preexisting notches and wherein the first and second light pipes are press fit into the preexisting notches in the cassette cover.

26. The tape cassette of claim 22 wherein the first and second light pipes have an external cross-section that mates with the cassette cover.

27. The tape cassette of claim 22 wherein the source receiving aperture is a tubular shaft extending into the cassette cover which has a light emitting aperture therethrough which in part defines the light path, and wherein the first light pipe is mounted so that its interior channel is aligned with the light emitting aperture.

28. The tape cassette of claim 27 wherein the improvement further comprises:
light source mask means, mounted adjacent the tubular shaft, for masking the light source to reduce light leaks.

29. The tape cassette of claim 28 wherein the light source mask means further comprises:
an insert disposed about a portion of the source receiving aperture within the tubular shaft.

30. The tape cassette of claim 29 wherein the tubular shaft has a shaft seam and wherein the insert is aligned to cover the shaft seam.

31. The tape cassette of claim 30 wherein the insert is formed integrally with the first light pipe.

32. The tape cassette of claim 31 wherein the insert and the integrally coupled first light pipe further comprise:
a molded plastic insert assembly.

* * * * *